Feb. 3, 1953 W. A. BRASTAD 2,627,557

SHIELD AND GUIDE FOR MAGNETIC RECORDER-REPRODUCER HEADS

Filed Sept. 6, 1946 2 SHEETS—SHEET 1

INVENTOR

WILLIAM A. BRASTAD

BY Arthur R. Wylie ATTY.

SHIELD AND GUIDE FOR MAGNETIC RECORDER-REPRODUCER HEADS

Filed Sept. 6, 1946 2 SHEETS—SHEET 2

INVENTOR
WILLIAM A. BRASTAD
BY Arthur R. Wylie
ATTY.

Patented Feb. 3, 1953 2,627,557

UNITED STATES PATENT OFFICE 2,627,557

SHIELD AND GUIDE FOR MAGNETIC RECORDER-REPRODUCER HEADS

William A. Brastad, Minneapolis, Minn., assignor to General Mills, Inc., a corporation of Delaware Application September 6, 1946, Serial No. 695,272

6 Claims. (Cl. 179—100.2)

This invention relates to heads for recording sound on wire and for reproducing sound magnetically recorded on the wire.

An object of the invention is the provision of means for damping the mechanical vibrations of the record wire as it passes through the head thereby reducing background noise recorded on the wire and noise thus generated during reproduction.

Another object is to provide means for shielding the head from stray electrostatic and electromagnetic fields and from mechanical injury and so to mount the shield as to enable it to be readily removed for changing reels.

Still another object is the provision of means for readily and accurately positioning the head with respect to the record wire to produce relations for the best signal-to-noise ratio in magnetic recordings reproduced from the wire.

These and other objects as will hereinafter appear are accomplished by this invention which is fully described in the following specification and shown in the accompanying drawings, in which Figure 1 is a front elevation of an embodiment of the same, showing the shield in raised position;

Figure 1:
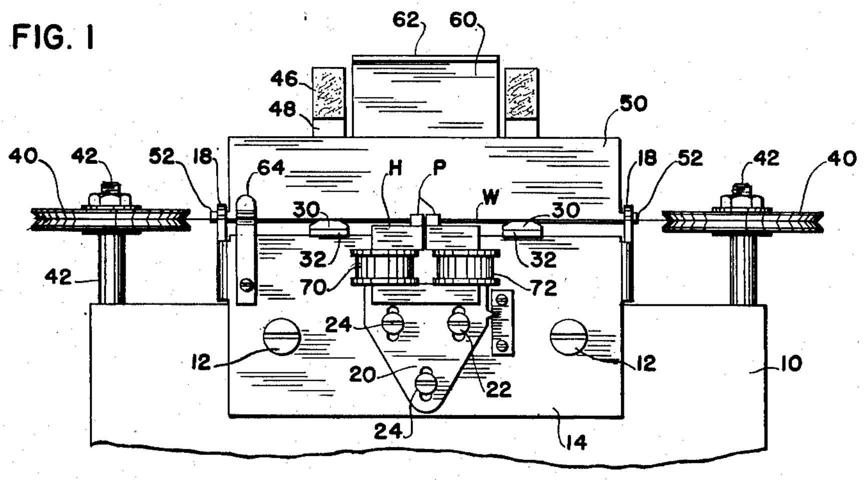

The recording and reproducing mechanism is here shown mounted on any suitable base 10 by means of screws 12 passing through front apron member 14. This apron member is of sheet metal having ears 18 turned up at each end and drilled to receive a pivot as will later be described.

The recording head, designated generally as H, is carried by bracket 20 which has a series of vertically extending holes 22 through which pass mounting screws 24 which are screwed into the apron 14.

Figure 2:
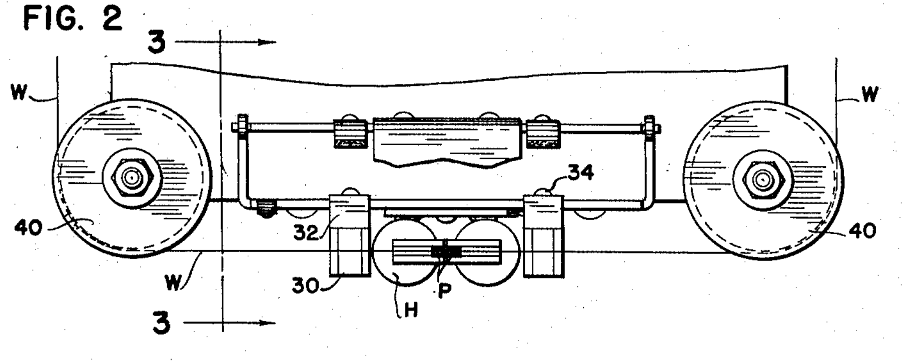
Fig. 2 is a top plan view of the same.
Figure 3:
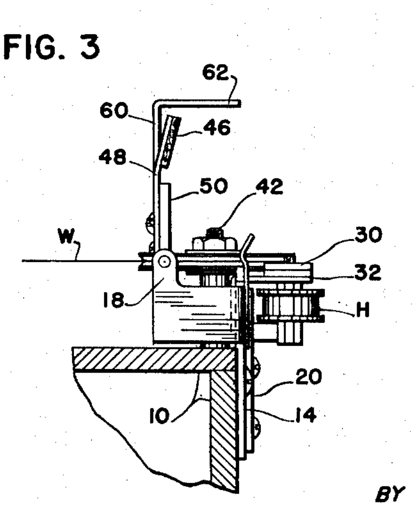
Fig. 3 is a partial section on the line 3—3 of Fig. 2.
Figure 4:
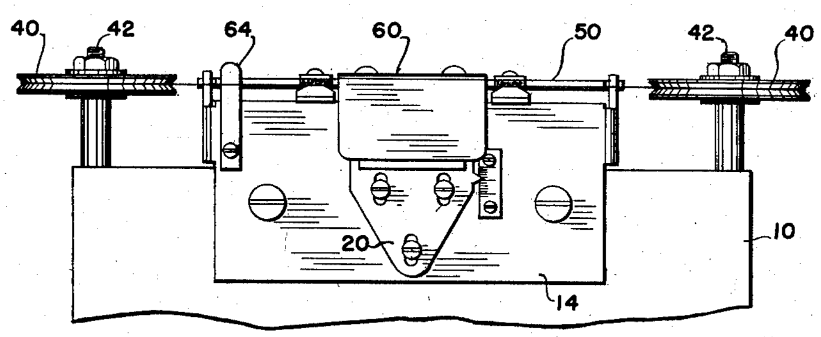
Fig. 4 is a view similar to Fig. 1 but with shield lowered.
Figure 5:
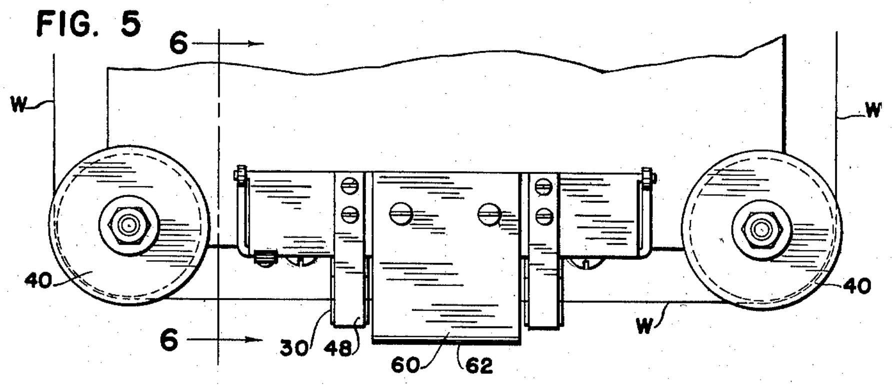
Fig. 5 is a top elevation of the same.
Figure 6:
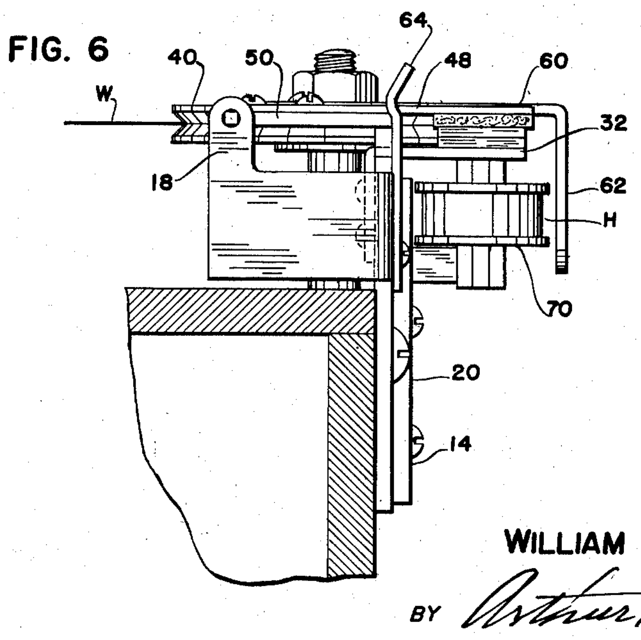
Fig. 6 is an enlarged side elevation also with the shield lowered, and is a partial section on the line 6—6 of Fig. 5.

At each side of the recording and reproducing head H is located a hard guide 30 which is carried on an arm 32, which is bent and secured to the back of the apron 14 as by means of screws 34 (Figs. 2 and 6).

The sheave 40 is rotatably mounted on a shaft 42 which is suitably carried by the top of the base 10. A wire W of paramagnetic material, preferably steel, passes around the sheave 40 through the recorder-reproducer head H, this wire being fed off one reel in a well-known manner, and on to another, neither of which reels is shown as they form no part of the present invention. This wire passes over the guide 30 and is yieldably pressed down on this guide by means of a felt pad 46 which is carried by a spring arm 48, which is carried by a shield member 50 which has a pin 52 at each end extending through the holes in the ears 18. The ends of the guides 30 are rounded to pass knots in the wire.

The wire W is ordinarily stretched tight enough to take out substantially all the slack, and as it passes over the guides 30 at a fairly good rate of speed there is a tendency to wear these guides. For that reason, they are preferably made of some very hard material, such as tungsten carbide.

The member 50 carries a shield 60 which overlies the head H and which has a front apron or drop 62 which in its lower position, as shown in Fig. 6, lies in front of the recording head. This shield is of paramagnetic material and serves to provide an electrostatic and electromagnetic shield for the head as well as to protect it against mechanical injury.

When the member 50 is rotated into the vertical position, the felt pads are raised from the hardened guides at the same time that the shield is removed from the head. The path of the wire is thus quickly made accessible for easy and rapid threading when reels are to be changed.

It will now be apparent that the wire W is stretched above the head H as shown in Fig. 1, the top of the core of the head being provided with facing pole pieces P through which a narrow groove is cut only slightly wider than the diameter of the wire W which passes therethrough.

I found that in the combination as described, the head must be adjusted vertically with great accuracy with respect to the wire so as to prevent noise on the one hand and to give loud and clear reproduction of sounds on the other. A setting which is satisfactory as a recording head also serves to give best results when the head is used for reproducing. This adjustment is accomplished by loosening the screws 24 and carefully raising and lowering the head while the shield 60 is lowered into place, as shown in Fig. 6, where it is preferably held by a spring clip 64.

The tension in the wire as it is pulled from one reel to the other will produce components of force perpendicular to the direction of motion of the wire when a section of said wire is displaced from an established line of motion. The guides 30 establish the horizontal position of the wire adjacent to the head H. If the head is mounted in too high a position, forces pulling the wire into the poles P will result. The usual variations in wire tension will thus give rise to varying force components tending to produce variable mechanical contact between wires and poles. Those familiar with the art will realize that such variations produce background noise.

The optimum vertical position of the head is one in which definite mechanical contact between wire and poles is realized, but in which forces perpendicular to the wire are held to a minimum. This optimum position can be identified by making small variations in the vertical position of the head while testing the response of the recorder-reproducer to a signal of constant amplitude and frequency. The lowest position that produces a normally loud record generally results in the best signal-to-noise ratio.

The head H is provided with coils 70, 72 which surround opposite legs of the field cores and these coils are electrically balanced with the shield lowered, as shown in Fig. 6, to overcome any stray field, particularly that generated in the recorder-reproducer itself as by means of the motor for driving the reels (not shown). This method of hum-eliminating is fully set forth in my application, Serial No. 669,260, filed May 13, 1946.

Thus, it will be seen that I have provided a very simple and efficient means for mounting the recorder-reproducer head and for preventing relative movement between the record wire and the pole pieces of the head, which largely prevents the recording of noise on the wire during the use of the head as a recorder and which also prevents much of the noise incident to using the head as a reproducer.

While I have described but a single embodiment of my invention, it is to be understood that it is capable of many modifications. Changes, therefore, may be made in the construction and arrangement without departing from the spirit and scope of the invention as defined in the appended claims.

I claim as my invention:

1. In a device of the class described, means for drawing, guiding and stretching an elongated recording medium along a given line, a recording-reproducing head associated with the medium, the guiding means including a hard lower guide for the medium lying at each side of the head maintaining the medium in a fixed lateral position and a soft upper pad positioned directly opposite said lower hard guide and adapted to press the medium down on each lower guide to serve as a guide and a vibration dampener, and means for adjusting the lateral operating position of the medium and head with respect to each other to obtain good recording and reproduction, the operating position of the medium being such that minimum clearance and zero contact pressure exist between the medium and head.

2. In a device of the class described, means for drawing, guiding and stretching an elongated recording medium wire along a given line, a recording-reproducing head associated with the medium, the guiding means including a hard lower guide for the medium located at each side of the head maintaining the medium in a fixed lateral position, and a hollow paramagnetic shield pivotally mounted at one side of the head and adapted to be swung over the same to serve as both a mechanical shield and an electromagnetic shield, and an upper pad member carried by the shield and adapted to cooperate with each lower guide to guide and dampen the medium passing therebetween.

3. In a device of the class described, a recorder-reproducer head, means for drawing an elongated recording medium across the head, a hollow paramagnetic shield pivotally mounted at one side to swing over the head, a hardened guide for the medium at each side of the head maintaining the medium in a fixed lateral position, and soft pads carried by the shield and adapted to yieldably press the medium against each guide to dampen the vibrations of the medium.

4. In a device of the class described, means for drawing, guiding and stretching an elongated recording medium along a given line, and a recording-reproducing head associated with the medium, the guiding means including a hard lower guide for the medium lying at the side of the head maintaining the medium in a fixed lateral position and a soft upper pad located laterally opposite the hard lowered guide and adapted to press the medium down on the lower guide to serve as a guide and a vibration dampener, said lateral position of the medium being with minimum clearance and zero contact pressure between the medium and head.

5. In a device of the class described, means linearly moving an elongated recording medium, a pair of spaced hard guides positioned adjacent the medium, a pair of soft resilient guides each positioned opposite one of said hard guides and adapted to press the medium against the hard guide, and a recording reproducing head having a pole positioned in a predetermined position in a direction lateral of the medium, there being minimum clearance and zero pressure between the recording medium and the pole.

6. In a device of the class described, means linearly moving an elongated recording medium, a recording reproducing head positioned adjacent the medium, a pair of hard guides positioned adjacent the recording medium at each side of the head, a hollow paramagnetic shield pivotally mounted at one side to swing over the head, soft pads carried by the shield and adapted to yieldably press the medium against each guide, and means for laterally adjusting the head with respect to the medium.

WILLIAM A. BRASTAD.

REFERENCES CITED

The following references are of record in the file of this patent:

UNITED STATES PATENTS

| Number | Name | Date |
|---|---|---|
| 2,044,033 | Heising | June 16, 1936 |
| 2,105,167 | Sinnett | Jan. 11, 1938 |
| 2,181,112 | Fries | Nov. 21, 1939 |
| 2,213,631 | Heller | Sept. 3, 1940 |
| 2,289,555 | Simons | July 14, 1942 |
| 2,306,162 | Gipe | Dec. 22, 1942 |
| 2,351,006 | Camros | June 13, 1944 |
| 2,513,653 | Kornei | July 4, 1950 |

FOREIGN PATENTS

| Number | Country | Date |
|---|---|---|
| 261,136 | Great Britain | Nov. 18, 1926 |
| 622,623 | Germany | Dec. 2, 1935 |
| 717,125 | Germany | Feb. 6, 1942 |